(12) United States Patent
Natsume et al.

(10) Patent No.: US 7,322,082 B2
(45) Date of Patent: Jan. 29, 2008

(54) EYEGLASS LENS PROCESSING APPARATUS

(75) Inventors: Katsuhiro Natsume, Toyohashi (JP); Yoichi Sugiura, Hekinan (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 11/393,657

(22) Filed: Mar. 31, 2006

(65) Prior Publication Data

US 2006/0240747 A1   Oct. 26, 2006

(30) Foreign Application Priority Data

Mar. 31, 2005   (JP) ............................ P2005-104609

(51) Int. Cl.
*B24B 9/14*     (2006.01)
*B23C 3/12*     (2006.01)
*B23B 9/06*     (2006.01)

(52) U.S. Cl. .................. 29/26 C; 29/27 C; 29/560; 409/202; 409/235; 408/97

(58) Field of Classification Search ............... 29/26 A, 29/27 C, 558, 560, 527.3, 702; 409/235, 409/165, 80, 84, 201, 202; 408/124, 97; 451/5, 8, 11, 41, 42, 44, 255, 265
See application file for complete search history.

(56) References Cited

U.S. PATENT DOCUMENTS

| | | | |
|---|---|---|---|
| 4,989,316 A * | 2/1991 | Logan et al. ............... | 29/527.3 |
| 5,716,256 A | 2/1998 | Mizuno et al. | |
| RE35,898 E | 9/1998 | Shibata et al. | |
| 6,478,657 B1 | 11/2002 | Shibata | |
| 6,481,095 B1 * | 11/2002 | Mizuno ....................... | 29/702 |
| 6,561,738 B1 * | 5/2003 | Fujita et al. ................. | 408/97 |
| 6,623,339 B1 * | 9/2003 | Igarashi et al. .............. | 451/42 |
| 6,641,460 B2 * | 11/2003 | Obayashi ..................... | 451/5 |
| 6,702,653 B2 * | 3/2004 | Shibata ....................... | 451/42 |

(Continued)

FOREIGN PATENT DOCUMENTS

JP          5-212661 A          8/1993

(Continued)

*Primary Examiner*—Dana Ross
(74) *Attorney, Agent, or Firm*—Sughrue Mion Pllc.

(57) ABSTRACT

An eyeglass lens processing apparatus for processing a periphery of an eyeglass lens, the apparatus includes: a lens chuck shaft that holds and rotates the lens; an end mill that processes the periphery of the lens; an end mill tilting unit that varies a tilt of the end mill with respect to the lens chuck shaft; an end mill moving unit that relatively moves the end mill with respect to the lens held by the lens chuck shaft; a target lens shape input unit that inputs an target lens shape; a lens measuring unit that detects a position of a processing edge of the lens based on the input target lens shape; a memory that stores a beveling shape including a beveling tilt angle on a front surface side of the lens and a beveling tilt angle on a rear surface side of the lens; and a control unit that controls the end mill tilting unit and the end mill moving unit to perform a roughing process on the lens using the end mill based on the input target lens shape and to perform a beveling process on the roughing-processed lens using the end mill based on the detected position of the processing edge and the stored beveling shape.

10 Claims, 13 Drawing Sheets

U.S. PATENT DOCUMENTS

| | | |
|---|---|---|
| 6,790,124 B2 | 9/2004 | Shibata |
| 7,111,372 B2 * | 9/2006 | Feldman et al. ............. 29/26 A |
| 2001/0053659 A1 * | 12/2001 | Shibata ........................ 451/42 |
| 2002/0072299 A1 * | 6/2002 | Obayashi ....................... 451/5 |
| 2003/0097741 A1 * | 5/2003 | Feldman et al. ............. 29/26 A |
| 2004/0192170 A1 * | 9/2004 | Mizun ........................... 451/5 |
| 2005/0020186 A1 * | 1/2005 | Schneider et al. ............ 451/41 |

FOREIGN PATENT DOCUMENTS

| | | |
|---|---|---|
| JP | 9-253999 A | 9/1997 |
| JP | 2001-18154 A | 1/2001 |
| JP | 2003-145328 A | 5/2003 |
| JP | 2004009201 A * | 1/2004 |

* cited by examiner

EYEGLASS LENS PROCESSING APPARATUS

BACKGROUND OF THE INVENTION

1. Technical Field

The present invention relates to an eyeglass lens processing apparatus for processing a periphery of an eyeglass lens.

2. Related Art

Eyeglass lens processing apparatuses for processing a periphery of an eyeglass lens so as to correspond to the shape of a rim of a pair of eyeglasses mainly employ grindstones (abrasive wheels). As examples of the grindstones, there are a roughing grindstone, a plane-finishing grindstone, a beveling (bevel-finishing) grindstone, a chamfering grindstone, a polishing grindstone and the like. There has been suggested an eyeglass lens processing apparatus having a drilling mechanism for forming a hole for fitting a rimless frame (that is, two-point frame) to a refractive surface of the lens, in addition to a mechanism for processing (grinding) the periphery of the lens using the grindstones.

However, it is necessary to supply processing water (grinding water) for the processing of the periphery of the lens using the grindstones. Further, a variety of grindstones are also required depending upon materials of the lens or final processing shapes. Since the drilling mechanism is disposed independently of the periphery processing mechanism, the configuration of the apparatus is complicated.

SUMMARY OF THE INVENTION

The present invention is contrived in view of the related arts. An object of the invention is to provide an eyeglass lens processing apparatus which enables to process an eyeglass lens in a dry manner.

In order to accomplish the above-mentioned object, the present invention provides the following configurations.

(1) An eyeglass lens processing apparatus for processing a periphery of an eyeglass lens, the apparatus comprising:

a lens chuck shaft that holds and rotates the lens;

an end mill that processes the periphery of the lens;

an end mill tilting unit that varies a tilt of the end mill with respect to the lens chuck shaft;

an end mill moving unit that relatively moves the end mill with respect to the lens held by the lens chuck shaft;

a target lens shape input unit that inputs an target lens shape;

a lens measuring unit that detects a position of a processing edge of the lens based on the input target lens shape;

a memory that stores a beveling shape including a beveling tilt angle on a front surface side of the lens and a beveling tilt angle on a rear surface side of the lens; and a control unit that controls the end mill tilting unit and the end mill moving unit to perform a roughing process on the lens using the end mill based on the input target lens shape and to perform a beveling process on the roughing-processed lens using the end mill based on the detected position of the processing edge and the stored beveling shape.

(2) The eyeglass lens processing apparatus according to (1), wherein the end mill is a plurality of end mills, wherein the end mill tilting unit varies tilts of the end mills with respect to the lens chuck shaft, respectively, and wherein the end mill moving unit relatively moves the end mills with respect to the lens held by the lens chuck shaft, respectively.

(3) The eyeglass lens processing apparatus according to (2), wherein the number of the end mills is two, and wherein the control unit controls the end mill tilting unit and the end mill moving unit to perform the beveling process on the front surface side of the lens using one of the end mills and to perform the beveling process on the rear surface side of the lens using the other end mill.

(4) The eyeglass lens processing apparatus according to (2), wherein the control unit controls the end mill tilting unit and the end mill moving unit to perform the roughing process and the beveling process simultaneously using the plurality of end mills.

(5) The eyeglass lens processing apparatus according to (1), wherein the memory stores a chamfering shape including a chamfering tilt angle on the front surface side of the lens and a chamfering tilt angle on the rear surface side of the lens, and wherein the control unit controls the end mill tilting unit and the end mill moving unit to perform a chamfering process on the roughing-processed lens using the end mill based on the detected position of the processing edge and the stored chamfering shape.

(6) The eyeglass lens processing apparatus according to (1), further comprising:

a drilling tool that forms a hole through a refractive surface of the lens, the drilling tool being coaxial with the end mill; and a hole position input unit that inputs a hole position, wherein the control unit controls the end mill tilting unit and the end mill moving unit to drill the lens using the drilling tool based on the input hole position.

(7) The eyeglass lens processing apparatus according to (6), wherein the end mill serves as the drilling tool.

PREFERRED EMBODIMENTS

Figure 1:
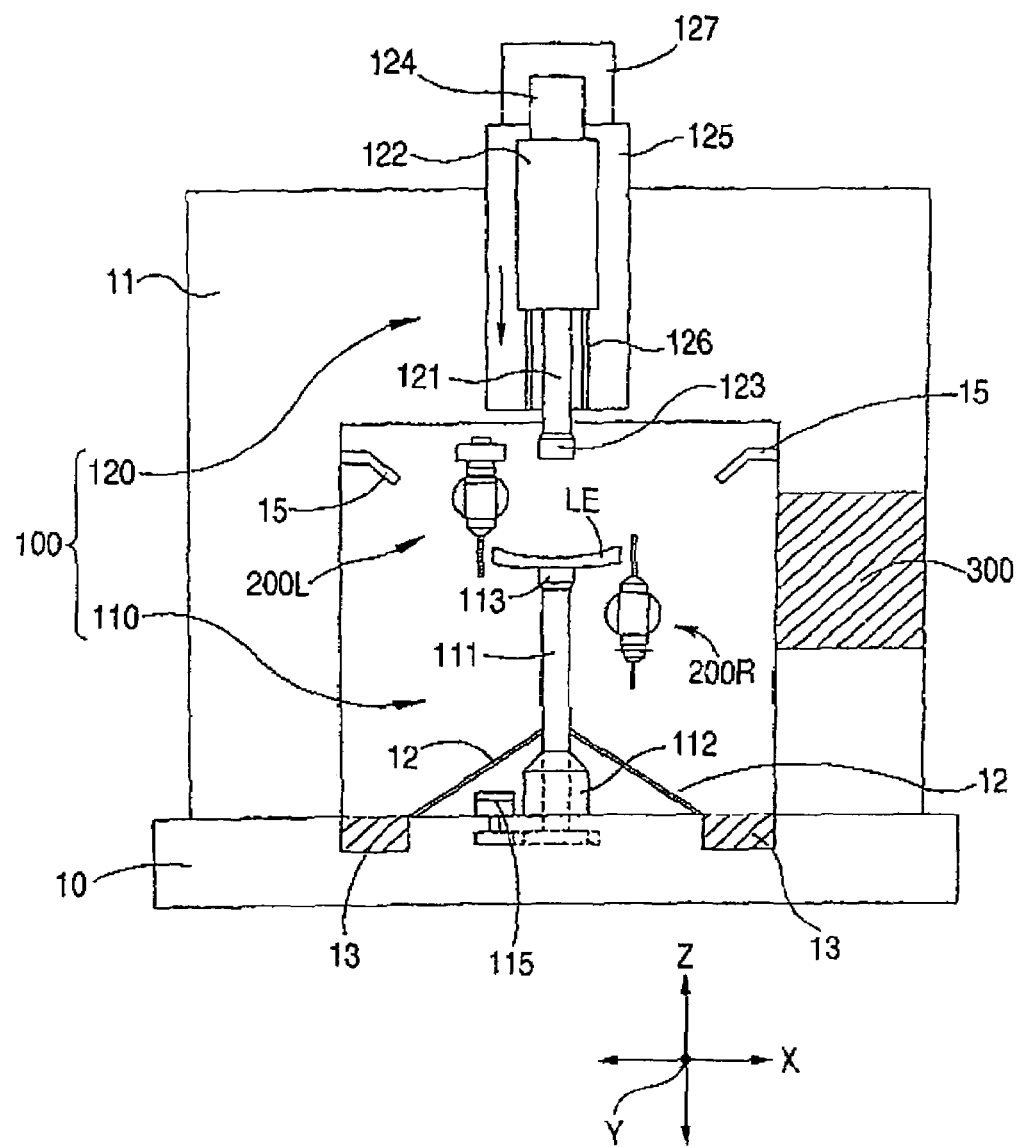
FIG. 1 is a diagram schematically illustrating a configuration of a lens processing section of an eyeglass lens processing apparatus according to an embodiment of the present invention.

Hereinafter, exemplary embodiments of the present invention will be described in detail with reference to the drawings. FIG. 1 is a diagram schematically illustrating a configuration of a lens processing section of an eyeglass lens processing apparatus according to an embodiment of the invention. A sub base 11 is disposed on a main base 10 and a lens holding unit 100 is disposed in the bases 10 and 11. The holding unit 100 includes a lower lens holding unit 110 and an upper lens holding unit 120. A lens LE to be processed is chucked (interposed) between a lens chuck shaft (lens rotating shaft) 111 of the holding unit 110 and a lens chuck shaft (lens rotating shaft) 121 of the holding unit 120. The chuck shaft 111 is rotatably supported by a holder 112 fixed to the main base 10 and is rotated by a pulse motor 115 fixed to the main base 10. The chuck shaft 121 is rotatably supported by a holder 122 and is rotated by a pulse motor 124 fixed to the holder 122. When the lens LE is rotated, the chuck shafts 111 and 121 are rotated by the motors 115 and 124 in synchronization with each other.

A fixed support base 125 is fixed to the upside of the sub base 11 and a guide rail 126 extending in the vertical direction (Z direction) is fixed to the front side of the support base 125. The holder 122 is supported by the rail 126 to be movable in the vertical direction and is moved by a motor 127 fixed to the support base 125. When the lens LE is chucked, the holder 122 is moved downwardly by the motor 127.

A cup holder 113 into which a cup fixed to the lens LE is inserted is disposed on the top end of the chuck shaft 111. A lens pressing member 123 is disposed on the bottom end of the chuck shaft 121.

Detailed configurations of the holding unit 100 are disclosed in U.S. Pat. No. 5,716,256 (Japanese Unexamined Patent Application Publication No. 9-253999).

The lower side of the holding unit 110 is covered with an inclined cover 12, and processing wastes of the lens LE are dropped and collected onto a tray 13 disposed on the main base 10. Nozzles 15 for jetting air are disposed on both sides of the holding unit 100 and the processing wastes of the lens LE are blown by the air at the time of processing.

Lens processing units 200R and 200L for processing the lens LE are disposed on both sides of the holding unit 100. The processing units 200R and 200L are movable in the horizontal direction (X direction) and the vertical direction (Z-direction) by horizontal and vertical movement units 250R and 250L, respectively.

Figure 2:
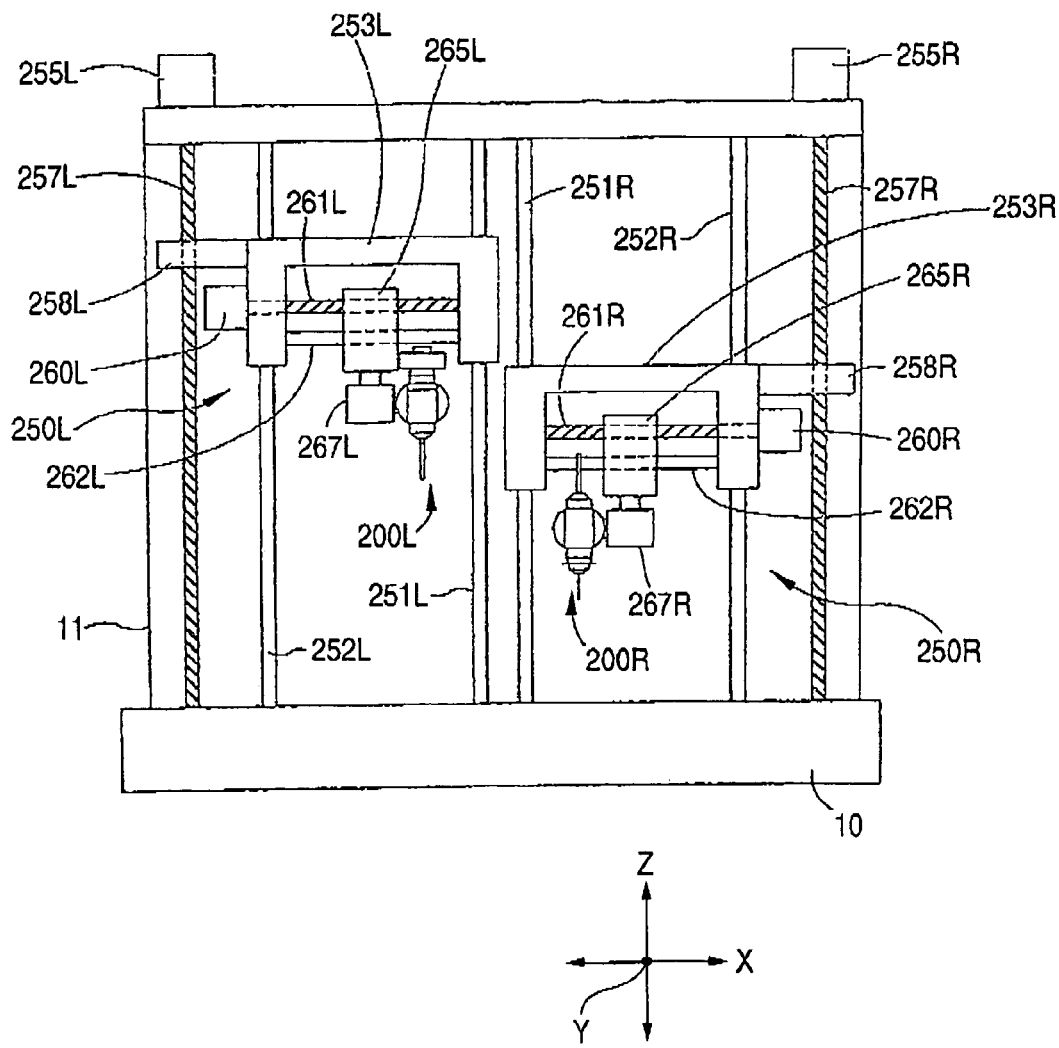
FIG. 2 is a diagram schematically illustrating horizontal and vertical movement units of lens processing units.

FIG. 2 is a diagram schematically illustrating a configuration of the movement units 250R and 250L. The movement unit 250R is described. Two guide shafts 251R and 252R are disposed parallel to each other in the vertical direction at the right side of the main base 10, and a moving support base 253R is supported by the guide shafts 251R and 252R to be movable in the vertical direction. A screw block 258R is fixed to the support base 253R, and a feed screw 257R parallel to the guide shafts 251R and 252R is screwed to a female screw of the screw block 258R. The feed screw 257R is connected to a pulse motor 255R and the support base 253R is moved by means of the rotation of the feed screw 257R due to the activation (drive) of the motor 255R. A feed screw 261R and a guide shaft 262R are disposed parallel to each other in the horizontal direction in the support base 253R, and a moving support base 265R is supported by the guide shaft 262R to be movable in the horizontal direction. The feed screw 261R is screwed to a female screw formed in the moving support base 265R, the feed screw 261R is connected to a pulse motor 260R, and the support base 265R is moved by the rotation of the feed screw 261R due to the activation (drive) of the motor 260R. The processing unit 200R is fixed to the support base 265R through a fixed support base 267R.

Since the movement unit 250L has a symmetric relation with the movement unit 250R, description of elements thereof is omitted. In FIG. 2, the elements of the movement unit 250L corresponding to those of the movement unit 25OR are denoted by replacing "R" of the reference numerals denoting the elements of the movement unit 250R with "L."

Figure 3:
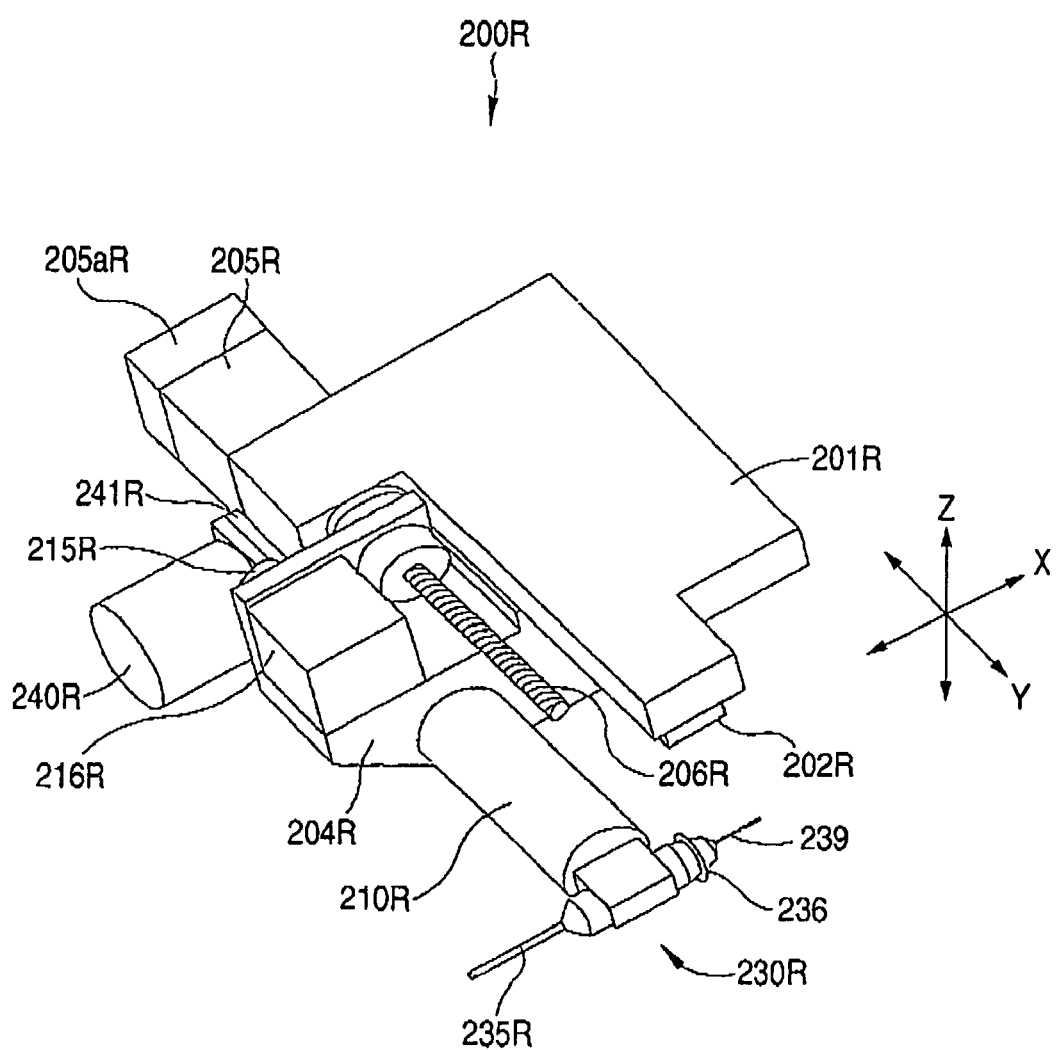
FIG. 3 is a perspective view of a right lens processing unit.
Figure 4:
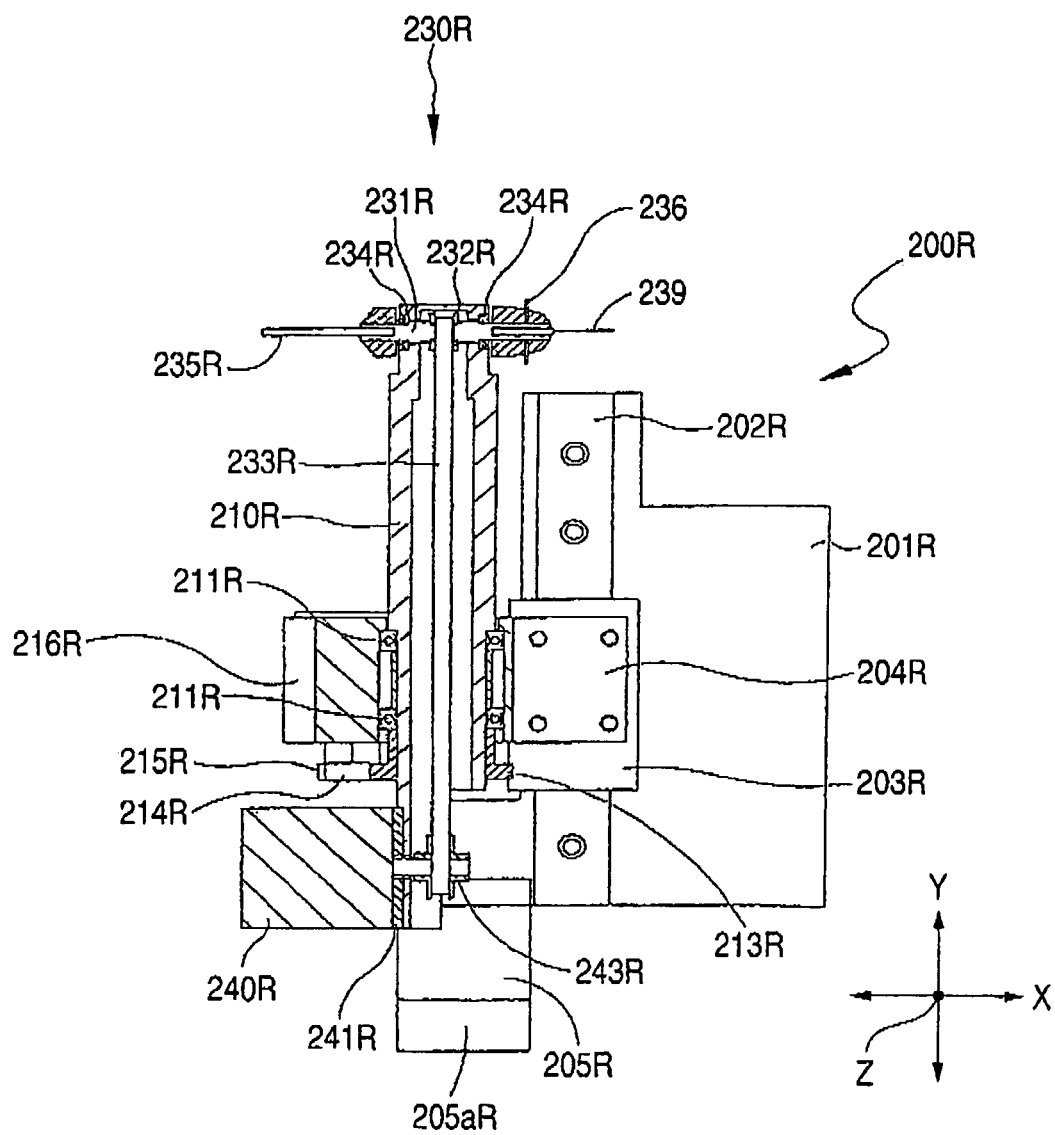
FIG. 4 is a sectional view of the right lens processing unit.

FIG. 3 is a perspective view of the processing unit 200R and FIG. 4 is a sectional view of the processing unit 200R. A fixed support base 201R as a base of the processing unit 200R is fixed to the support base 267R (see FIG. 2). A guide rail 202R extending in the cross direction (Y direction) is fixed to the support base 201R, and a moving support base 204R is supported through a slider 203R by the guide rail 202R so as to be movable in the cross direction. The support base 204R is moved by the rotation of a feed screw 206R due to the activation (drive) of a motor 205R fixed to the support base 201R. An encoder 205aR for detecting the movement position (amount of movement) of the support base 204R in the cross direction is disposed in the motor 205R.

A rotating support base 210R is pivotally supported through a bearing 211R by the support base 204R. A gear 213R is fixed to the support base 210R on one side of the bearing 211R. A gear 215R fitted to a rotating shaft of a pulse motor 216R fixed to the support base 204R engages with the gear 213R with an idle gear 214R disposed therebetween, and the support base 210R is rotated about the axis of the bearing 211R by the activation (drive) of the motor 216R.

A processing tool holder 230R for supporting a processing tool is provided at an end of the support base 210R. The holder 230R is moved in the cross direction with the movement of the support base 204R. A pulley 232R is disposed at the center of a rotating shaft 231R of the holder 230R, and the rotating shaft 231R is pivotally supported by two bearings 234R. An end mill 235R is fitted to one side of the rotating shaft 231R. The diameter of the end mill 235R is about 3.0 mm. A cutter 236 for a grooving and an end mill 239 for a drilling are fitted to the other side of the rotating shaft 231R. The diameter of the end mill 239 is preferably about 1.0 mm or less.

A pulse motor 240R for rotating the rotating shaft 231R is fixed to a fitting plate 241R fitted to the support base 210R. A pulley 243R is fitted to a rotating shaft of the motor 240R and a belt 233R is suspended on the pulley 232R and the pulley 243R. Accordingly, the rotation of the motor 240R is transmitted to the rotating shaft 231R. The rotational angle of the holder 230R is controlled by the number of pulses output to the motor 216R.

Figure 5:
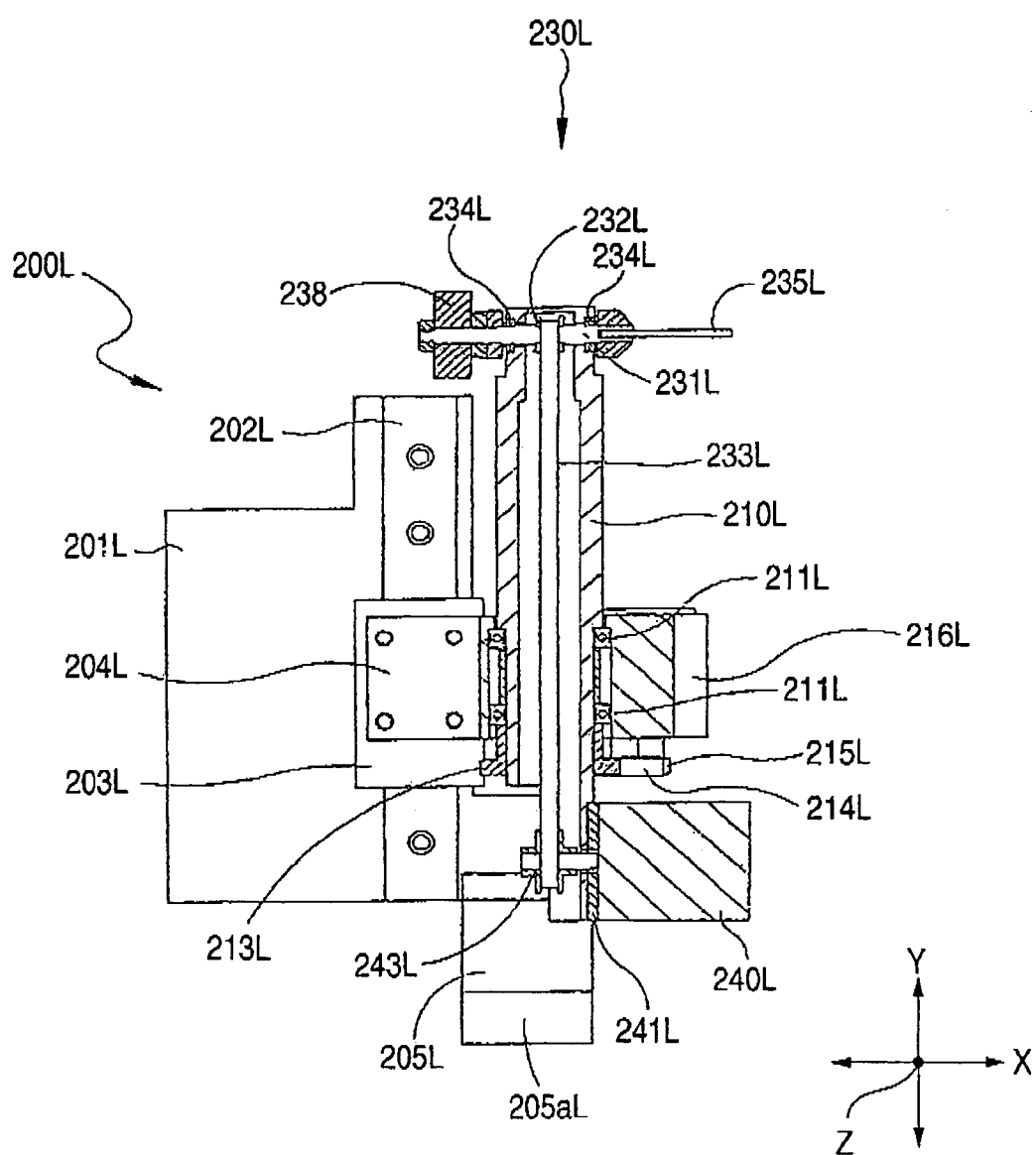
FIG. 5 is a sectional view of a left lens processing unit.

FIG. 5 is a sectional view of the processing unit 200L. Since the processing unit 200L basically has a symmetric relation with the processing unit 200R, description of the elements thereof is omitted. In FIG. 5, the elements of the processing unit 200L corresponding to those of the processing unit 200R are denoted by replacing "R" of the reference numerals denoting the elements of the processing unit 200R with "L." However, in the processing unit 200L, a polishing soft buff 238 is fitted to the rotating shaft 231L, instead of the cutter 236 of the processing unit 200R.

Figure 6:
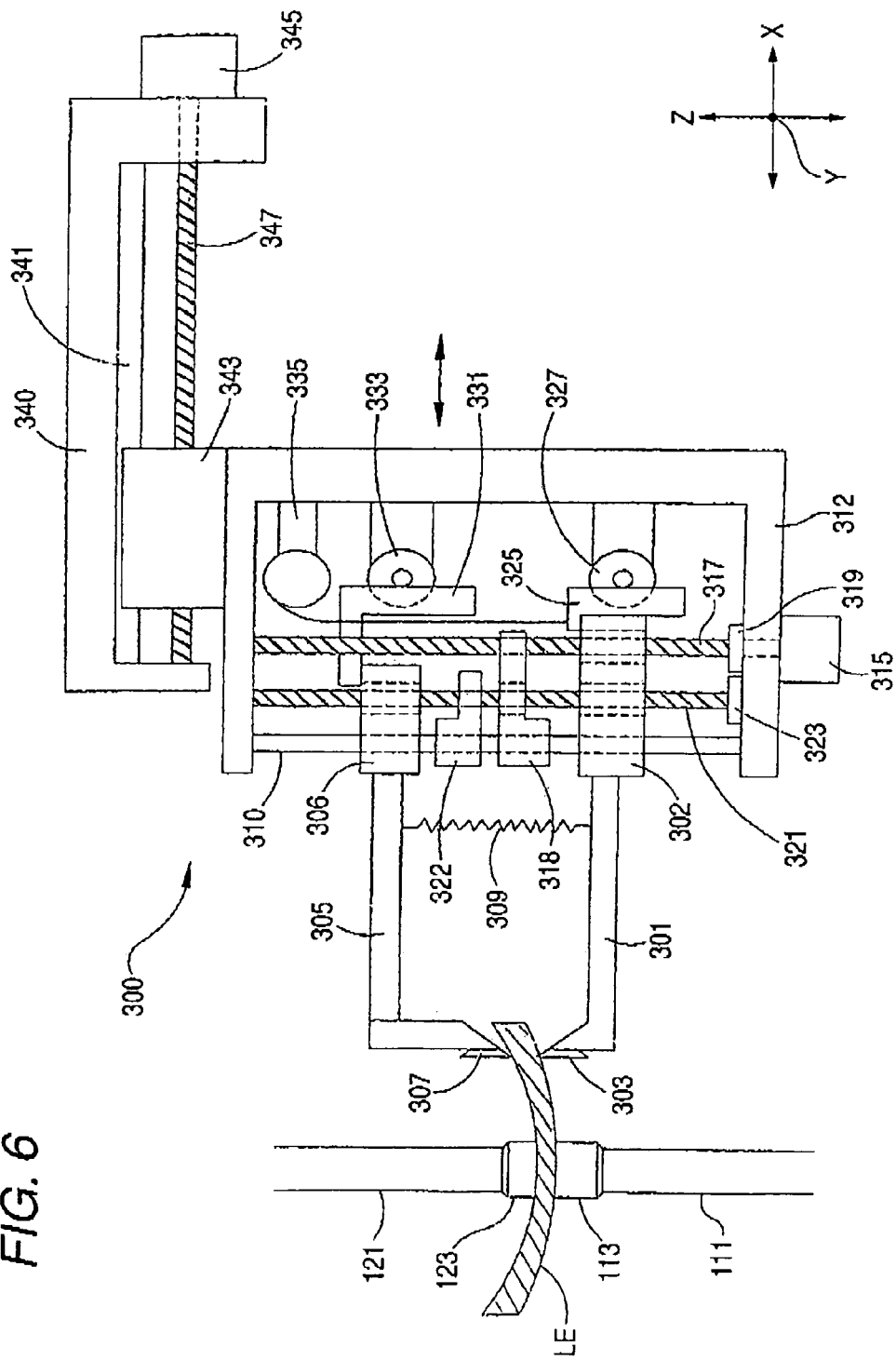
FIG. 6 is a diagram schematically illustrating a lens measuring unit.

FIG. 6 is a diagram schematically illustrating a configuration of a lens measuring unit 300 disposed on the right side of the sub base 11 (see FIG. 1) so as to detect a position of a processing edge of the lens LE. A first feeler 303 coming in contact with a front refractive surface of the lens LE (hereinafter, referred to as a front lens surface) is fitted to an end of a first arm 301, and a second feeler 307 coming in contact with a rear refractive surface of the lens LE (hereinafter, referred to as a rear lens surface) is fitted to an end of a second arm 305. A moving support base 302 to which the arm 301 is fixed and a moving support base 306 to which the arm 305 is fixed are supported by a guide shaft 310 vertically disposed in a moving support base 312 so as to be movable in the vertical direction. A tension spring 309 is disposed between the arm 301 and the arm 305, and the arms 301 and 305 are always biased in a direction in which a gap between both is decreased. Moving support bases 318 and 322 are supported by the guide shaft 310 so as to be movable in the vertical direction. A first feed screw 317 vertically extending parallel to the guide shaft 310 is connected to a motor 315 fixed to the lower side of the support base 312, the first feed screw 317 is screwed to a female screw formed in the support base 318, and the support base 318 is moved by the rotation of the first feed screw 317 due to the activation (drive) of the motor 315. A gear 319 is fixed to the first feed screw 317, and a gear 323 fixed to a second feed screw 321 vertically extending parallel to the first feed screw 317 engages with the gear 319. Accordingly, the second feed screw 321 is rotated in the direction opposite to the first feed screw 317 through the gears 319 and 323 by the rotation of the first feed screw 317 due to the activation (drive) of the motor 315. The second feed screw 321 is screwed to a female screw formed in the support base 322, and the support base 322 is moved by the rotation of the second feed screw 321 due to the activation (drive) of the motor 315. For example, when the motor 315 is activated in the forward direction, the support base 318 is moved downwardly to push the support base 302 downwardly, and the support base 322 is moved upwardly to push the support base 306 upwardly. Accordingly, the gap between the arms 301 and 305 is increased. On the other hand, when the motor 315 is activated in the reverse direction, the support base 318 is moved upwardly, the support base 322 is moved downwardly, and thus the tension spring 309 is elongated to decrease the gap between the arm 301 and the arm 305.

A rack 325 is fixed to the right side of the support base 302, and the movement position (amount of movement) of the rack 325 is detected by a first detector 327 such as a potentiometer fixed to the support base 312. A rack 331 is fixed to the right side of the support base 306, and the movement position (amount of movement) of the rack 331 is detected by a second detector 333 such as a potentiometer fixed to the support base 312. The weight of the arm 301 is cancelled by a spring 335 and the weight of the arm 305 is cancelled by a spring not shown.

A screw block 343 is fixed to the support base 312 and the screw block 343 is supported by a guide rail 341 fixed to a fixed support base 340 so as to be movable in the horizontal direction. A feed screw 347 is connected to a motor 345 fixed to the support base 340, and the support base 312 is moved in the horizontal direction by means of the rotation of the feed screw 347 due to the activation (drive) of the motor 345.

The measurement is performed as follows. The feelers 303 and 307 are located at horizontal measurement positions based on target lens shape data, the first feeler 303 comes in contact with the front lens surface, and the second feeler 307 comes in contact with the rear lens surface. In this state, the lens LE is rotated, and the support base 312 is moved in the horizontal direction based on the target lens shape data. The vertical movement position of the first feeler 303 is detected by the detector 327, thereby detecting a processing edge position of the front lens surface. At the same time, the vertical movement position of the second feeler 307 is detected by the detector 333, thereby detecting a processing edge position of the rear lens surface.

Figure 7:
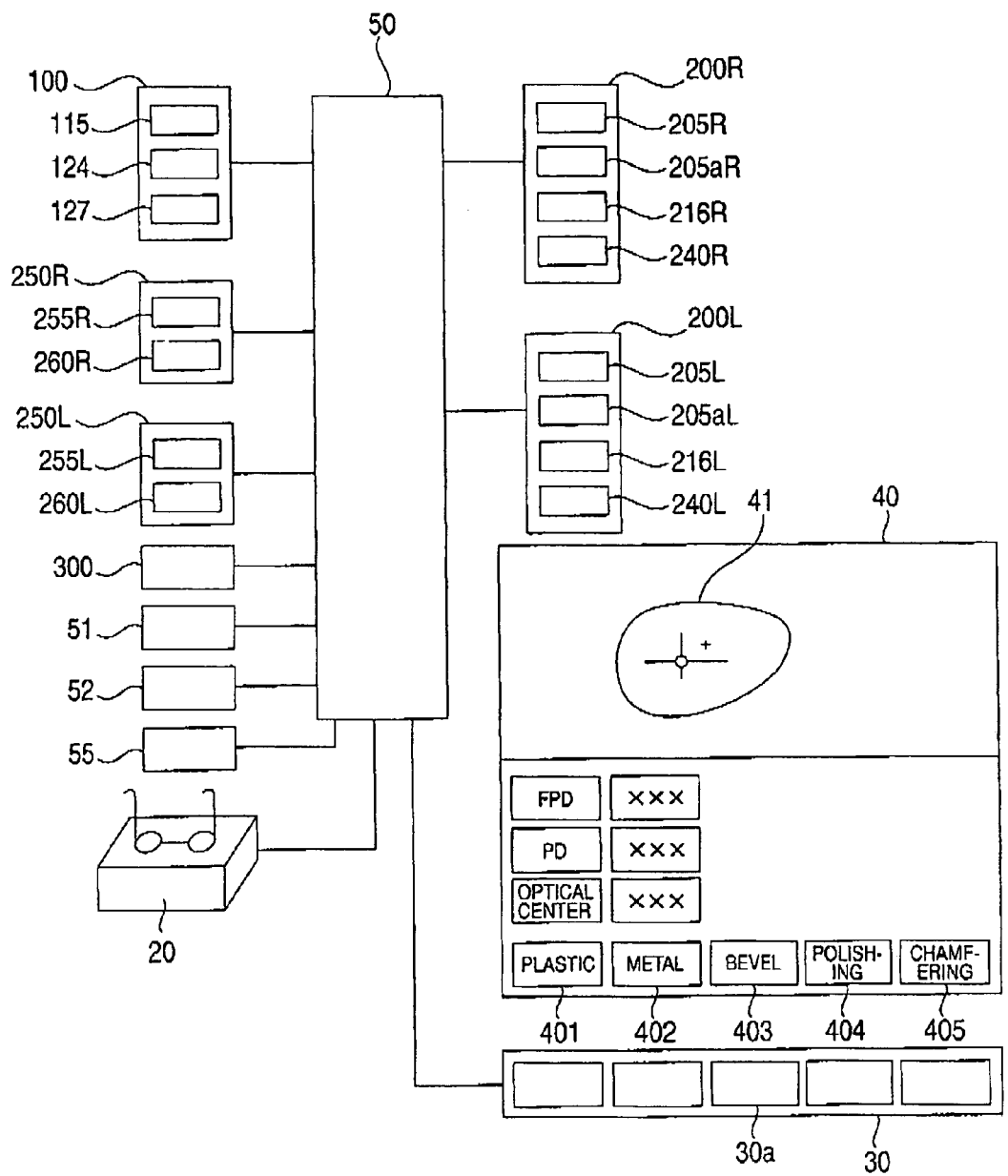
FIG. 7 is a block diagram schematically illustrating a control system of the eyeglass lens processing apparatus.

FIG. 7 is a block diagram schematically illustrating a control system of the apparatus. The holding unit 100, the movement units 25OR and 250L, the processing units 20OR and 200L, and the measuring unit 300 are connected to a control unit 50, which controls the operations of the units. Further, a memory 51 for storing the target lens shape data, a memory 52 for storing a control program of a processing sequence, a device 20 for measuring an eyeglass rim shape, a touch panel 40 having a display for displaying target lens shape information and layout information, and an operation panel 30 having a processing start switch 30a are connected to the control unit 50. Since the known device described in US Re. 35898 (Japanese Unexamined Patent Application Publication No. 5-212661) can be used as the measuring device 20, description thereof is omitted.

Next, operations of the eyeglass lens processing apparatus having the above-mentioned structure are described. First, right and left rim shapes of an eyeglass are measured by the measuring device 20, and the target lens shape data thereof are input. In case of a rimless frame, a shape of a template or a shape of a dummy lens is measured, and the target lens shape data thereof are input. The input target lens shape data are stored in the memory 51. When the target lens shape data are input, a target lens shape FIG. 41 based on the input target lens shape data are displayed on the screen of the touch panel 40. Next, layout data such as a distance FFD between geometrical centers of the left and right target lens shapes, a distance PD between pupils, and optical center heights with respect to the geometrical centers of the target lens shapes are input by operating touch keys displayed on the touch panel 401. The material of the lens LE, the kind of the frame, the processing mode, necessity of a polishing process, necessity of a chamfering process, and the like are selected by pressing the keys 401 to 405. Since the processing modes are displayed on a menu screen by operation of the key 403, a beveling mode, a plane-finishing mode, a grooving mode, and a drilling mode can be selected from the menu screen.

First, the beveling mode is described. When the lens LE is chucked between the chuck shafts 111 and 121 and the eyeglass lens processing apparatus is activated by the use of the start switch 30a, the control unit 50 activates the measuring unit 300 to detect the processing edge positions of the front lens surface and the rear lens surface based on the input target lens shape data. In the beveling mode, for example, the processing edge position C1 of a bevel apex VT and the processing edge positions C2 of bevel bottoms VF and VR in the meridian direction are detected (see FIG. 8).

When the measurement of the lens LE (the detection of the processing edge positions) is finished, the roughing process is performed. The control unit 50 controls the motors 255R and 260R of the movement unit 250R and the motors 205R and 216R of the processing unit 200R to locate the end mill 235R on the right side of the chuck shafts 111 and 121 in parallel thereto. In addition, the control unit 50 controls the motors 255L and 260L of the movement unit 250L and the motors 205L and 216L of the processing unit 200L to locate the end mill 235L on the left side of the chuck shafts 111 and 121 in parallel thereto. That is, the end mill 235R and the end mill 235L are positioned to be symmetric with the chuck shafts 111 and 121. The control unit 50 rotates the lens LE and controls the motors 260R and 260L based on the target lens shape data to simultaneously process the periphery of the lens LE at two horizontal positions by the use of the sides of the end mills 235R and 235L, respectively. The roughing process is finished with almost half rotation. That is, the process time is substantially reduced to a half in comparison with the case that the roughing process is performed by the use of one end mill.

Figure 8:
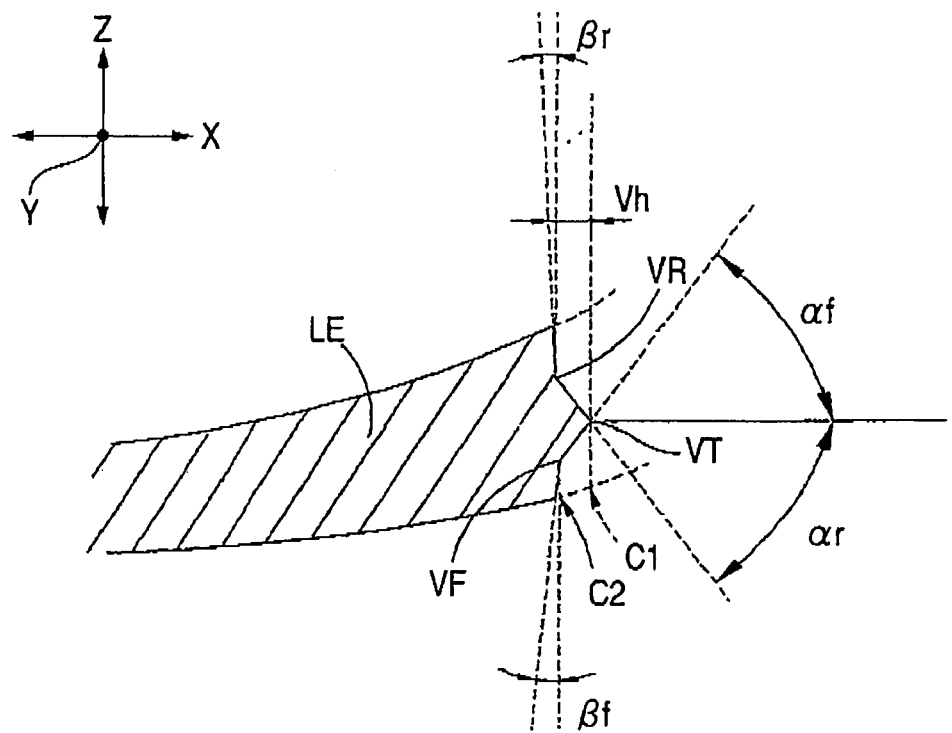
FIG. 8 is a diagram illustrating a bevel formed in an eyeglass lens.
Figure 9:
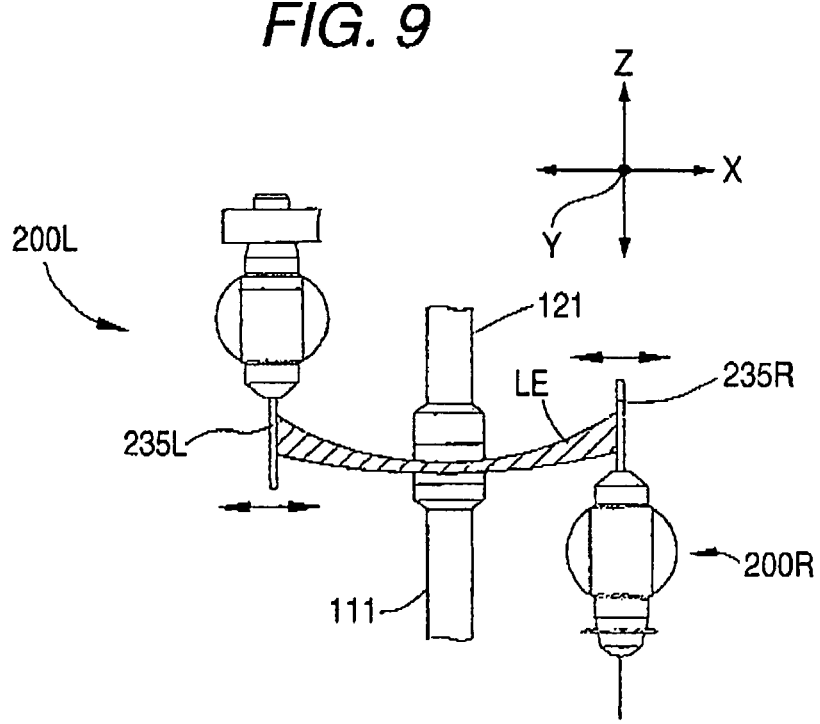
FIG. 9 is a diagram illustrating a roughing process using an end mill.

When the roughing process is finished, the beveling process is performed. FIG. 8 is a diagram illustrating a bevel formed on the lens LE. In the eyeglass lens processing apparatus, the beveling process is also performed by the use of the end mills 235R and 235L. Accordingly, a beveling tilt angle of (a tilt angle of the bevel incline) of the front lens surface side, a beveling tilt angle $\alpha r$ (a tilt angle of the bevel incline) of the rear lens surface side, and a bevel processing height Vh (height from the bevel apex VT to the bevel bottoms VF and VR) are stored as beveling shape data in the memory 52 in advance. The angles $\alpha f$ and $\alpha r$ are angles about the direction perpendicular to the vertical direction and are all, for example, 55° about the bevel apex VT. The height Vh is, for example, 0.9 mm. In the embodiment, an angle $\beta f$ (for example, 5°) of a bevel shoulder from the bevel bottom VF of the front lens surface side to the front lens surface and an angle $\beta r$ (for example, 2.5°) of a bevel shoulder from the bevel bottom VR of the rear lens surface side to the rear lens surface are stored as the beveling shape data in the memory 52 in advance.

In the beveling process, the control unit 50 calculates a path $VTi(xi, yi, zi)$ (i=1, 2, 3, ..., N) of the bevel apex VT as the beveling data based on the processing edge positions of the front lens surface and the rear lens surface. The path VTi of the bevel apex VT is obtained by the use of a known method such as a method of dividing the thickness of the processing edge with a predetermined ratio (for example, 3:7) or the like. When the path Vti of the bevel apex VT is obtained, a path $VFi(xi, yi, zi)$ (i=1, 2, 3, ..., N) of the bevel bottom VF of the front lens surface side and a path $VRi(xi, yi, zi)$ (i=1, 2, 3, ..., N) of the bevel bottom VR of the rear lens surface side are calculated based on the angles $\alpha f$ and $\alpha r$ and the height.

Figure 10A:
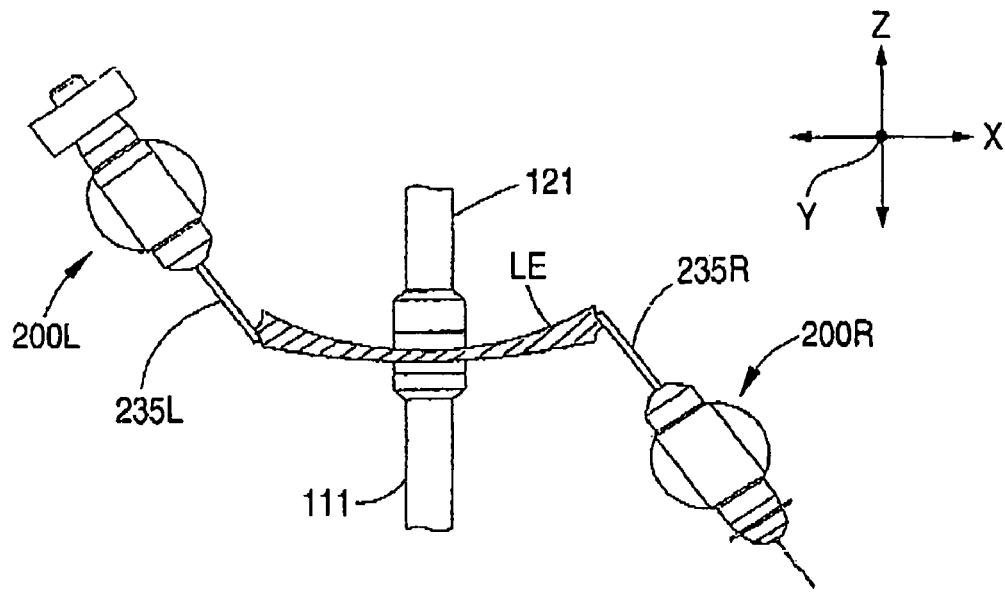
FIG. 10 is a diagram illustrating a beveling process using the end mill.
Figure 10B:
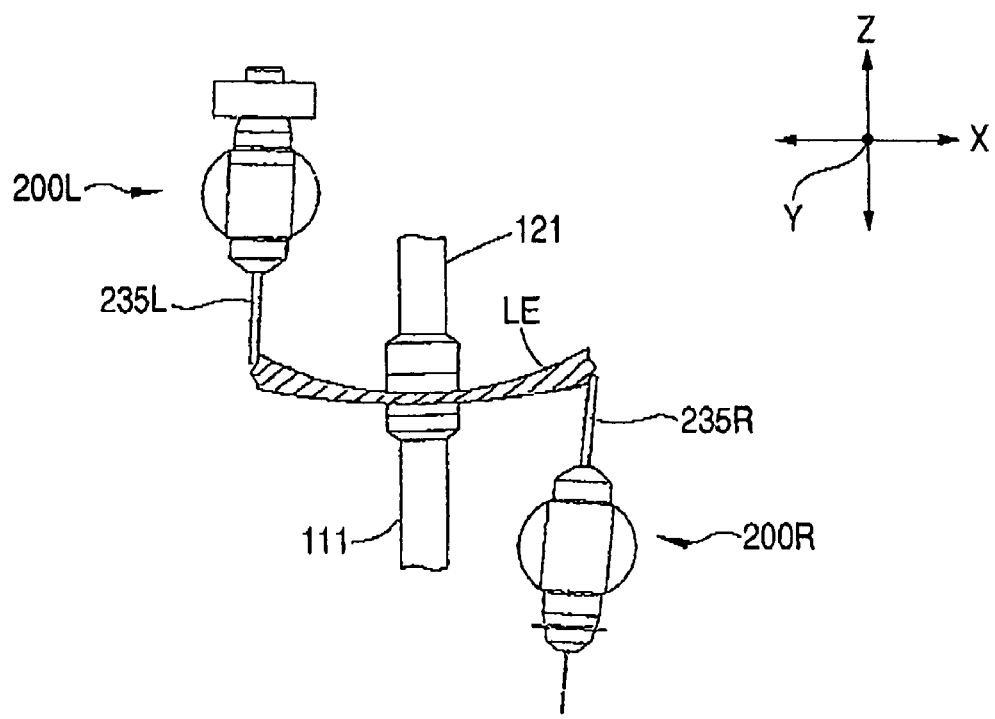

The beveling process, which is performed after the roughing process has been performed, is described. As shown in FIG. 10A, the control unit 50 drives the motor 216R based on the angle $\alpha r$ to control the tilt of the end mill 235R and drives the motors 255R, 260R, 205R based on the beveling path to control the position of the end mill 235R, thereby processing the bevel incline of the rear lens surface side with the side of the end mill 235R while rotating the lens LE at a speed smaller than that of the roughing process. The control unit 50 drives the motor 216L based on the angle $\alpha f$ to control the tilt of the end mill 235L and drives the motors 255L, 260L, 205L based on the beveling path to control the position of the end mill 235L, thereby processing the bevel incline of the rear lens surface side with the side of the end mill 235L. As shown in FIG. 10B, the control unit 50 controls the tilt of the end mill 235R based on the angle $\beta f$ and controls the position of the end mill 235R based on the beveling path, thereby processing the bevel shoulder of the front lens surface side with the side of the end mill 235R. In addition, the control unit 50 controls the tilt of the end mill 235L based on the angle $\beta r$ and controls the position of the end mill 235L based on the beveling path, thereby processing the bevel shoulder of the rear lens surface side with the side of the end mill 235L. Since the bevel inclines and the bevel shoulders of the front lens surface side and the rear lens surface side are simultaneously processed with two end mills 235R and 235L, the process time is reduced in comparison with the case employing one end mill. When the beveling process is performed using a high-curved lens (for example, 6-curved or more lens), a beveling grindstone often causes a phenomenon that the bevel is thinned due to interference. However, in the embodiment, since the beveling process is performed using an end mill having a diameter smaller than that of the beveling grindstone, the phenomenon that the bevel is thinned is suppressed.

In the eyeglass lens processing apparatus, the process time can be reduced by simultaneously performing the processes by the use of two processing units 200R and 200L, but the processes may be performed by the use any one processing unit. The bevel inclines and/or the bevel shoulders may be processed by the use of the ends of the end mills 235R and 235L, instead of the sides thereof.

The angles $\alpha f$ and $\alpha r$, the height Vh, and the angles $\beta f$ and or stored in the memory 52 may be changed to desired values stored therein by setting parameters through the operation of the touch panel 40.

Figure 11A:
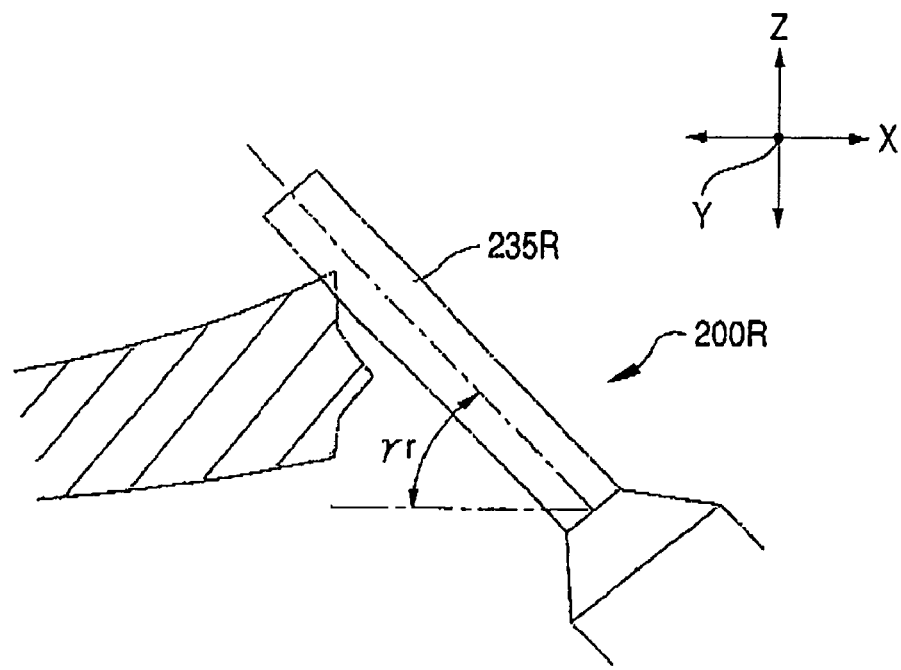
FIG. 11 is a chamfering process using the end mill.
Figure 11B:
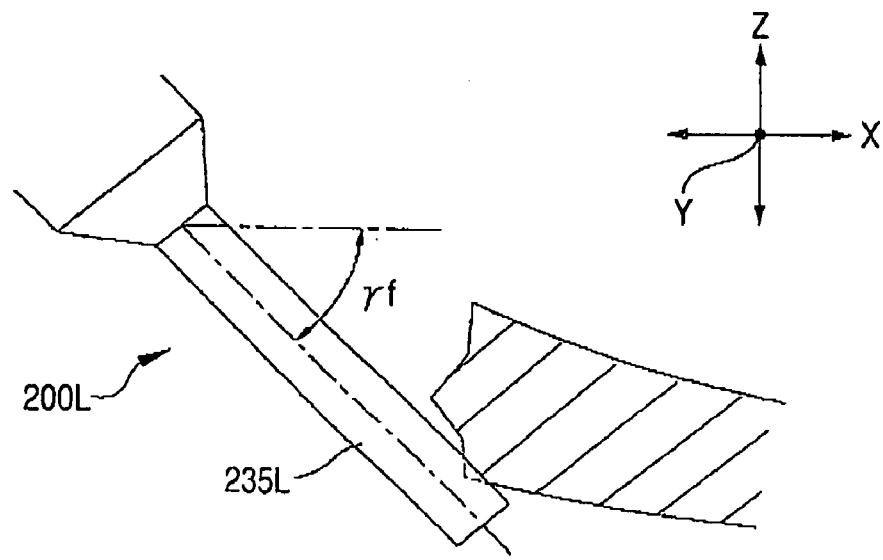

When the chamfering process is designated, the chamfering process is performed after the beveling process has been performed. The control unit 50 calculates chamfering paths of the front lens surface side and the rear lens surface side based on the detected processing edge positions and predetermined amounts of chamfering. In the chamfering process, as shown in FIGS. 11A and 11B, a chamfering tilt angle $\gamma r$ (a tilt angle of a chamfering incline) of the rear lens surface side and a chamfering tilt angle $\gamma f$ (a tilt angle of a chamfering incline) of the front lens surface side are stored in the memory 52 in advance. The control unit 50 controls the tilt of the end mill 235R based on the angle $\gamma r$ and controls the position of the end mill 235R based on the chamfering path of the rear lens surface side, thereby processing the chamfering incline of the rear lens surface side with the side of the end mill 235R while rotating the lens LE at a speed smaller than that of the roughing process (see FIG. 11A). At the same time, the control unit 50 controls the tilt of the end mill 235L based on the angle $\gamma f$ and controls the position of the end mill 235L based on the chamfering path of the front lens surface side, thereby processing the chamfering incline of the front lens surface side with the side of the end mill 235L (see FIG. 11B). Since the front lens surface and the rear lens surface are simultaneously chamfered by the use of two end mills 235R and 235L, the process time is reduced. The angles $\gamma r$ and $\gamma f$ and the chamfering amount stored in the memory 52 can be changed to desired values stored therein.

When the polishing process is designated, the polishing process is performed after the beveling process and the chamfering process have been performed. The polishing process is performed by the use of the buff 238 of the processing unit 200L. The control unit 50 rotates the buff 238 at a high speed, controls the tilt of the buff 238 based on the angles $\alpha r$ and $\alpha f$, the angles $\beta r$ and $\beta f$, and the angles $\gamma r$ and $\gamma f$, and controls the position of the buff 238 based on the beveling path and the chamfering path, thereby performing the polishing process to the lens LE.

Next, the plane-finishing mode is described. As described above, the control unit 50 performs the roughing process by the use of the end mills 235R and 235L. Thereafter, the control unit 50 controls the tilt and position of one or both of the end mills 235R and 235L, thereby performing the plane-finishing process to the lens LE.

Figure 12:
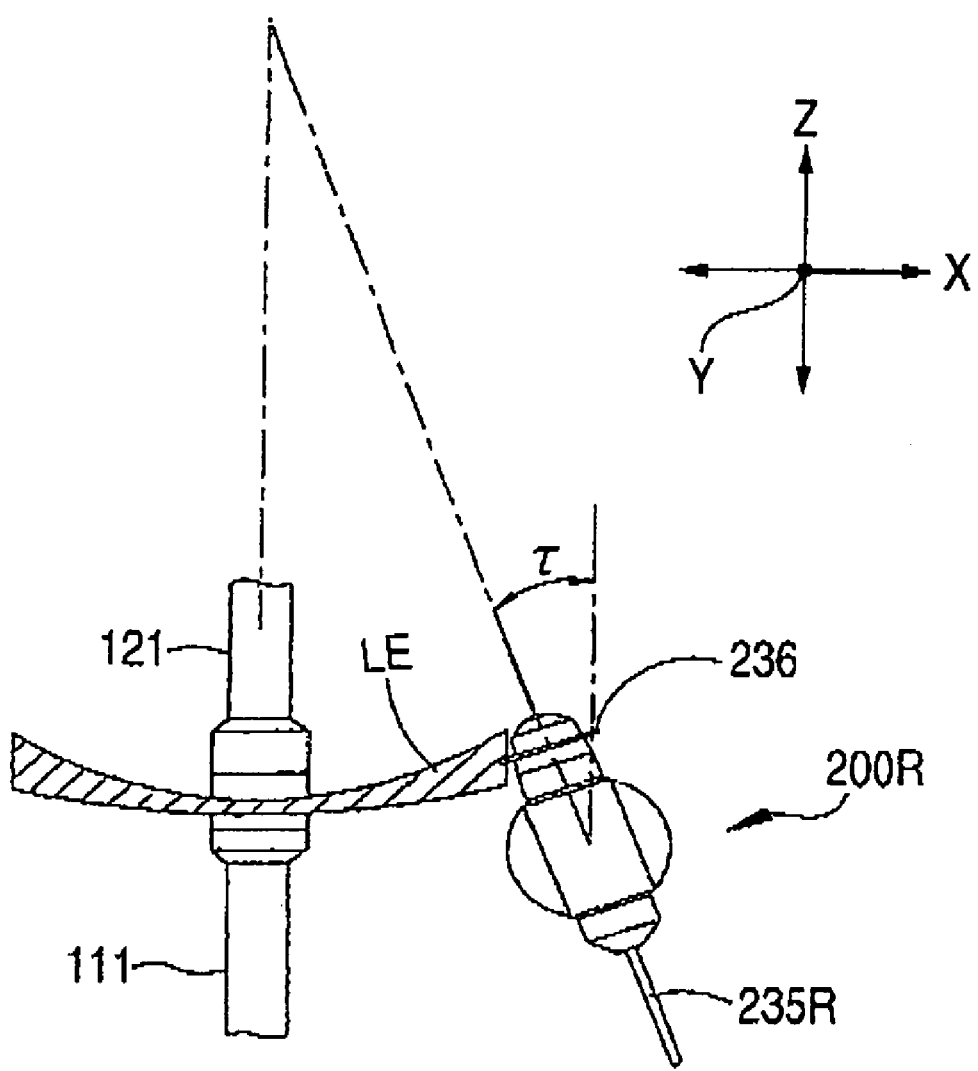
FIG. 12 is a diagram illustrating a grooving process using a cutter.

Next, the grooving mode is described. As described above, the control unit 50 performs the roughing process by the use of the end mills 235R and 235L and then performs the plane-finishing process by the use of one or both of the end mills 235R and 235L. The control unit 50 calculates a grooving path as grooving data based on the detected processing edge positions. The grooving path is obtained similarly to the bevel apex path. In order to perform the grooving process by the use of the cutter 236 of the processing unit 200R, as shown in FIG. 12, the control unit 50 calculates a tilt angle τ of the cutter 236 based on the grooving path. The control unit 50 controls the tilt of the cutter 236 based on the angle τ and controls the position of the cutter 236 based on the grooving path, thereby performing the grooving process to the lens LE.

Figure 13:
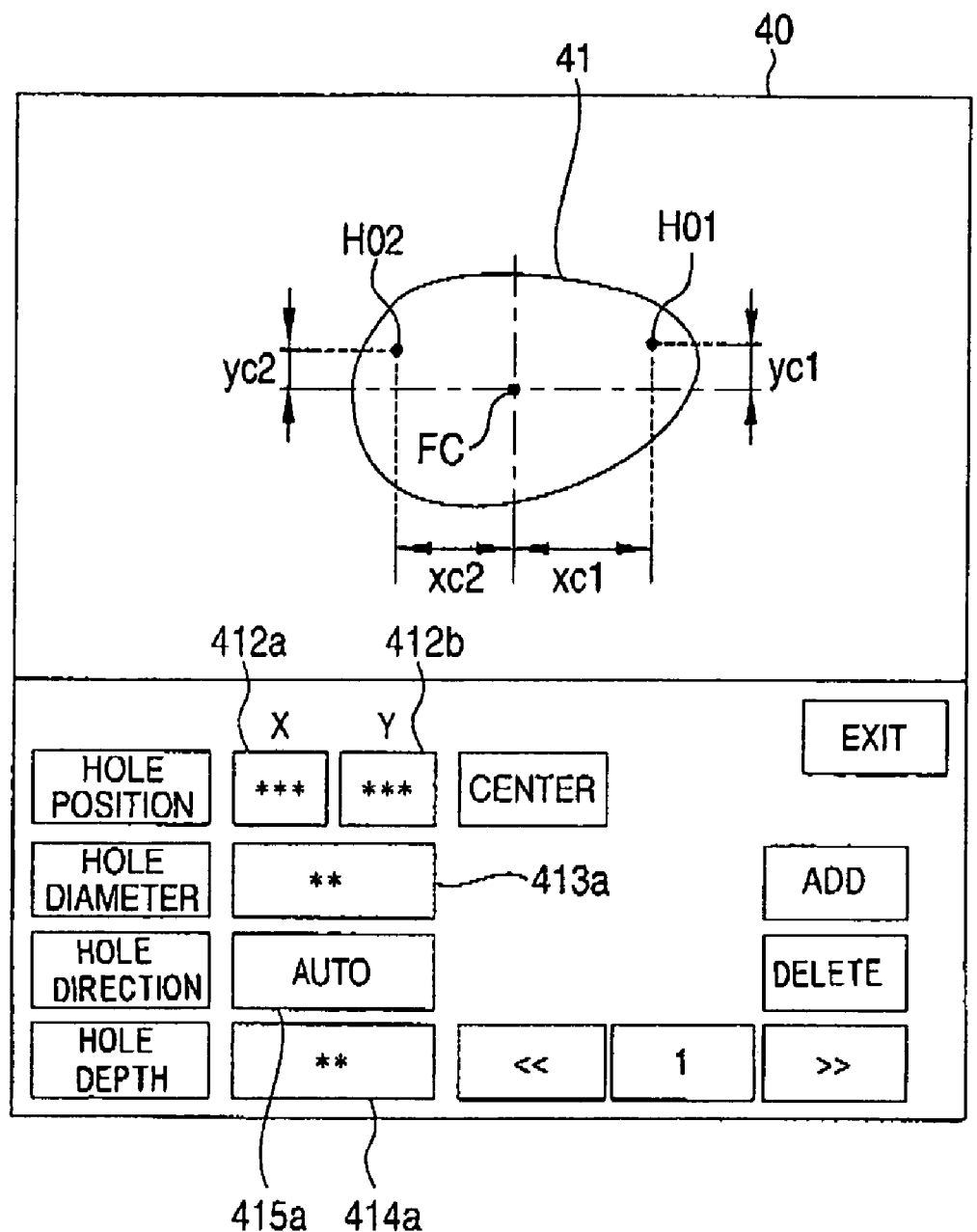
FIG. 13 is a diagram illustrating an example of a screen for inputting a hole position.

Next, the drilling mode is described. After layout data have been input, a screen for inputting a hole position is displayed. FIG. 13 illustrates an example of the screen for inputting the hole position. Here, a hole H01 is formed close to a nose and a hole H02 is formed close to an ear. The hole positions are input based on an orthogonal coordinate system in which a horizontal direction at the time of wearing the eyeglass is an X axis direction and a vertical direction at the time of wearing the eyeglass is a Y axis direction with respect to a geometrical center FC of the target lens shape 41. The positions of the hole H01 and the hole Ho2 are input through hole positions input columns 412a and 412b. The x axial position of the hole H01 is input as a value xc1 with respect to the center FC and the y axial position of the hole H01 is input as a value yc1 with respect to the center FC. The x axial position of the hole H02 is input as a value xc2 with respect to the center FC and the y axial position of the hole H02 is input as a value yc2 with respect to the center FC. The diameters of the hole H01 and the hole H02 are input through a hole diameter input column 413a. When a spot facing hole (non-penetrated hole) is formed, a hole depth is input through a hole depth input column 414a. When the holes are formed in a direction normal to the front lens surface, an auto process is selected through a hole direction input column 415a. A desired direction may be input as the hole direction.

Figure 14:
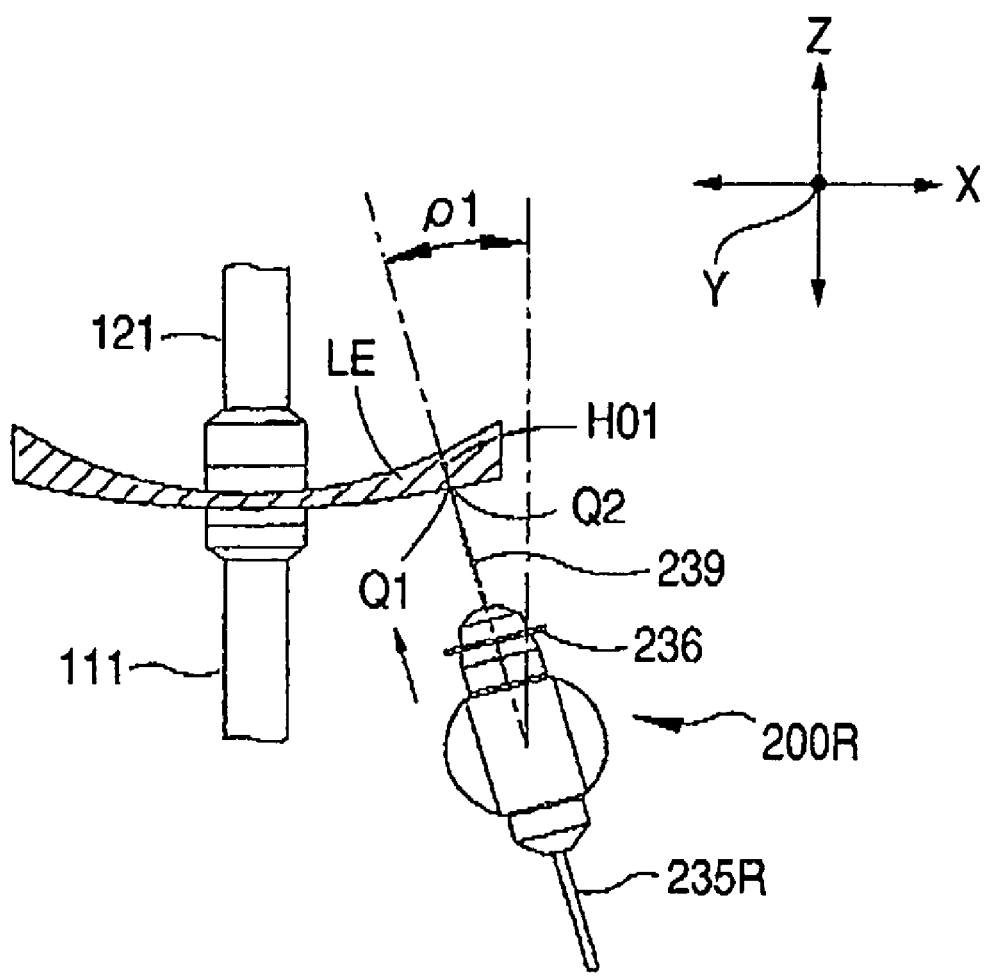
FIG. 14 is a diagram illustrating a drilling process using an end mill.

When necessary data such as the hole position are input, the control unit 50 activates the measuring unit 300, and detects a processing edge position Q1 on the front lens surface side for the hole H01 and a processing edge position Q2 slightly outward (for example, outward by 0.5 mm) in the same meridian direction based on the input hole position, as shown in FIG. 14. The control unit 50 calculates the incline angle of the front lens surface based on the detected processing edge positions Q1 and Q2, and calculates an angle ρ1 normal to the incline angle as a drilling angle for the hole H01. Similarly, the control unit 50 detects the processing edge position for the hole H02 slightly outward from the same meridian direction as the processing edge position on the front lens surface side, calculates the incline angle of the front lens surface based on the detected processing edge position, and calculates an angle normal to the incline angle as a drilling angle for the hole H02.

As described above, the control unit 50 performs the roughing process by the use of the end mills 235R and 235L, and additionally performs the plane-finishing process by the use of one or both of the end mills 235R and 235L. Next, the control unit controls the tilt of the end mill 239 based on the angle ρ1 and controls the motors 115, 124, 255R, 260R, and 205R based on the hole position Q1, thereby locating the end of the end mill 239 at the hole position Q1. Then, the control unit 50 controls the motors 255R and 260R to allow the end of the end mill 239, which rotates at a high speed, to advance in the direction of the angle ρ1, thereby performing the drilling process for the hole H01. Similarly, the drilling process for the hole H02 is performed by the use of the end mill 239 based on the angle ρ2 and the hole position. The drilling process may be performed by further fitting the end mill 239 to the processing unit 200L.

FIGS. 10A and 10B are diagrams illustrating a beveling process using the end mill.

FIGS. 11A and 11B illustrates a chamfering process using the end mill.

As described above, it is possible to perform the roughing process, the beveling process, the plane-finishing processing, and the chamfering process without using the processing water, unlike the processes using grindstones. At the time of performing the processes, air is jetted from the nozzles 15 by activating the air pump 55, and the blown processing wastes are dropped and collected in the tray 13 and then wasted. In addition, since a processing water supply unit is not necessary, it is possible to simplify the configuration of the eyeglass lens processing apparatus. Since the end mills 235R and 235L are cheaper than the grindstones, it is possible to reduce the cost for manufacturing the eyeglass lens processing apparatus.

In the above-mentioned embodiment, the chuck shafts 111 and 121 are disposed in the vertical direction and the processing units 200R and 200L are moved relative to the lens LE by means of the movement units 250R and 250L. However, a carriage type in which the chuck shafts 111 and 121 are disposed in the horizontal direction may be employed as described in U.S. Pat. No. 6,790,124 (Japanese Unexamined Patent Application Publication No. 2003-145328. In this case, by allowing a carriage supporting the chuck shafts 111 and 121 to move in the horizontal direction and the vertical direction, the movement units 250R and 250L may be omitted.

In the above-mentioned embodiment, the end mills 235R and 235L for performing the periphery process have a diameter larger than that of the end mill 239 for performing the drilling process, and both are used for different purposes. However, the end mills 235R and 235L may have a diameter of about 1.0 mm, and thus may be used in common for the periphery process and the drilling process.

In addition, since the periphery processing is performed by the use of the end mills 235R and 235L (or the end mill 239) having a diameter smaller than that of a grindstone which requires a relatively large diameter, it is possible to perform a finer process and thus to enhance the degree of freedom in design for processing an eyeglass lens.

What is claimed is:

1. An eyeglass lens processing apparatus for processing a periphery of an eyeglass lens, the apparatus comprising:
   a lens chuck shaft that holds and rotates the lens;
   an end mill that processes the periphery of the lens;
   an end mill tilting unit that varies a tilt of the end mill with respect to the lens chuck shaft;
   an end mill moving unit that relatively moves the end mill with respect to the lens held by the lens chuck shaft;
   a target lens shape input unit that inputs an target lens shape;
   a lens measuring unit that detects a position of a processing edge of the lens based on the input target lens shape; and
   a control unit that controls the end mill tilting unit and the end mill moving unit to perform a roughing process on the lens using the end mill while locating the end mill to be parallel to the chuck shaft based on the input target lens shape and to perform a beveling process on the roughing-processed lens using the end mill while tilting the end mill with respect to the chuck shaft based on the detected position of the processing edge and an input or stored beveling shape.

2. The eyeglass lens processing apparatus according to claim 1, wherein the end mill is a plurality of end mills, wherein the end mill tilting unit varies tilts of the plurality of end mills with respect to the lens chuck shaft, respectively, and wherein the end mill moving unit relatively moves the plurality of end mills with respect to the lens held by the lens chuck shaft, respectively.

3. The eyeglass lens processing apparatus according to claim 2, wherein the number of the plurality of end mills is two, and wherein the control unit controls the end mill tilting unit and the end mill moving unit to perform the beveling process on a front surface side of the lens using one of the two end mills and to perform the beveling process on a rear surface side of the lens using the other of the two end mills.

4. The eyeglass lens processing apparatus according to claim 2, wherein the control unit controls the end mill tilting unit and the end mill moving unit to perform the roughing process and the beveling process simultaneously using the two end mills.

5. The eyeglass lens processing apparatus according to claim 1, wherein the control unit controls the end mill tilting unit and the end mill moving unit to perform a chamfering process on the roughing-processed lens using the end mill while tilting the end mill with respect to the chuck shaft based on the detected position of the processing edge and the input or stored chamfering shape.

6. The eyeglass lens processing apparatus according to claim 5 further comprising a memory that stores a beveling shape including a beveling tilt angle on a front surface side of the lens and a beveling tilt angle on a rear surface side of the lens.

7. The eyeglass lens processing apparatus according to claim 1 further comprising a memory that stores a beveling shape including a beveling tilt angle on a front surface side of the lens and a beveling tilt angle on a rear surface side of the lens.

8. The eyeglass lens processing apparatus according to claim 1, wherein the control unit tilts the end mill with respect to the chuck shaft when at least one of a front surface side of the lens and a rear surface side of the lens is beveled.

9. The eyeglass lens processing apparatus for processing a periphery of an eyeglass lens, the eyeglass lens processing apparatus comprising:

a lens chuck shaft that holds and rotates the lens:

an end mill that processes the periphery of the lens:

an end mill tilting unit that varies a tilt of the end mill with respect to the lens chuck shaft;

an end mill moving unit that relatively moves the end mill with respect to the lens held by the lens chuck shaft:

a target lens shape input unit that inputs an target lens shape:

a lens measuring unit that detects a position of a processing edge of the lens based on the input target lens shape; and a control unit that controls the end mill tilting unit and the end mill moving unit to perform a roughing process on the lens using the end mill based on the input target lens shape and to perform a beveling process on the roughing-processed lens using the end mill based on the detected position of the processing edge and an input or stored beveling shape;

a drilling tool that forms a hole through a refractive surface of the lens, the drilling tool being coaxial with the end mill; and a hole position input unit that inputs a hole position, wherein the control unit controls the end mill tilting unit and the end mill moving unit to drill the lens using the drilling tool based on the input hole position.

10. The eyeglass lens processing apparatus according to claim 9, wherein the end mill serves as the drilling tool.

* * * * *